Nov. 21, 1967 R. W. MITCHELL, JR 3,354,439

ELECTROCHEMICAL MEMORY

Filed Oct. 29, 1962 2 Sheets-Sheet 1

Roscoe W. Mitchell Jr. INVENTOR.

BY Gary C. Honeycutt

Roscoe W. Mitchell Jr. INVENTOR.
BY Gary C. Honeycutt
ATTORNEY

United States Patent Office 3,354,439
Patented Nov. 21, 1967

3,354,439
ELECTROCHEMICAL MEMORY

Roscoe W. Mitchell, Jr., Tulsa, Okla., assignor, by mesne assignments, to Esso Production Research Company, Houston, Tex., a corporation of Delaware
Filed Oct. 29, 1962, Ser. No. 233,787
3 Claims. (Cl. 340—173)

This invention relates to an electronic device for use in switching circuits and digital memory units. A new circuit element is provided which utilizes electroplating to achieve switching or storage of data in binary form.

In the design of digital computers, various memory systems are available for the storage of data in binary form. Magnetic recording systems have proven to be the most useful type of memory device, and the most common of these are the magnetic drum and the magnetic core devices. Although these magnetic types have been used extensively and have been found highly satisfactory for most purposes, they are known to possess certain disadvantages. The magnetic drum is a relatively slow memory system and is also handicapped to some extent by the fact that physical motion is required for its operation, which naturally causes the drum to wear and deteriorate with age. The magnetic core memories have low capacities and also require the use of complex electronic circuits to detect the minute currents induced by the change of state characteristic of the magnetic core. A principal disadvantage of the magnetic core memory arises from the destructive nature of the readout step. That is, the data stored in the magnetic core system is lost whenever it is read, and must be re-stored by a read-write loop which further complicates the computer design.

This invention overcomes these and other disadvantages of magnetic core data storage systems. The device includes an electrolytic bath in which three electrodes are immersed. Two of the electrodes are positioned within the bath to provide a narrow gap. These two electrodes are preferably electrically insulated with respect to the electrolytic bath, except for a small conductive surface on each side of the gap. The gap may be bridged by electroplating a metal from the bath onto either or both of the narrowly separated conductive surfaces of the two electrodes. The third electrode is provided to serve as the anode of an electroplating circuit in bridging the gap, and as a cathode by reversing the flow of current when it is desired to clear or reopen the gap. Thus the device may serve as an electrochemical toggle switch or latching relay, in addition to its suitability for data storage in binary form. In connection with the latter application a logical "0" could be the relatively high resistance of the chemical solution filling the open gap, while a logical "1" would be the low resistance of the gap when bridged with an electroplate.

Figure 1:
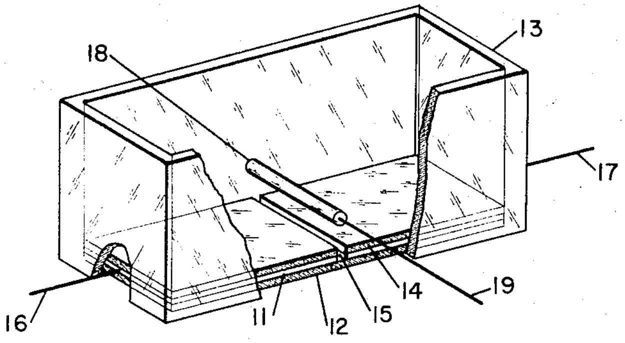
FIGURE 1 shows in detail one embodiment of the switching device or memory cell of the invention.

The embodiment shown in FIGURE 1 is constructed by depositing a gold layer 11 on the glass plate bottom 12 of container 13. The gold layer is then insulated by a coating of epoxy resin 14. A narrow gap 15 is then provided in the gold and resin layers by "engraving" a narrow slit through the gold and resin layers applied to base plate 12. The separate parts of the gold layer now serve as electrodes to which are attached leads 16 and 17. A copper electrode 18 is positioned substantially parallel to gap 15. Electrode 18 and gap 15 are then immersed in a copper sulfate solution. Insulating layer 14 must completely seal the gold layer from contact with the copper sulfate bath, except for the conducting gold surfaces opposite gap 15. It will be readily appreciated that container 13 may be much smaller than indicated in the drawing, since the volume of electrolytic bath required is only a volume sufficient to immerse the conducting surfaces of gold layer 11, which form the sides of gap 15, and copper electrode 18.

The gold electrodes of this embodiment may be replaced by any other relatively inactive metal, preferred examples of which are silver and platinum. Similarly, the insulating material may be selected from any of various commercially available materials, the epoxy resin being only a convenient example. Also electrode 18 may be selected from any of various electroplatable metals such as chromium, zinc or nickel, in which case the copper sulfate bath will be replaced by a chromium, zinc or nickel salt, respectively. Alternatively, substantially equivalent embodiments may readily be designed.

It is particularly noteworthy that the narrowly spaced electrodes forming gap 15 need not be structurally mounted on either the base or a wall of container 13. That is, such electrodes may extend centrally within container 13, independently of a container wall, provided that the materials used have sufficient rigidity to be self-supporting and to maintain the dimensions of gap 15. Moreover, it is not essential that gap 15 be elongated as shown in the embodiment of FIGURE 1. For example, bead-shaped, spherical, or semi-spherical electrodes may extend centrally within container 13 such that the dimensions of gap 15 are fixed by the closest proximity to which the opposing curved surfaces extend.

Figure 2:
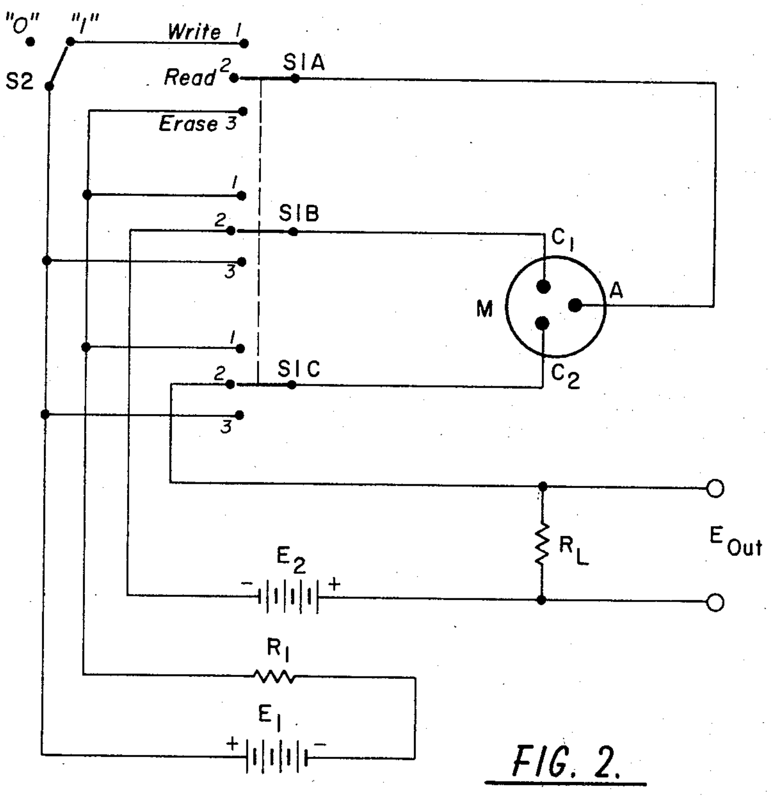
FIGURE 2 shows a simplified electrical circuit for use in conjunction with the device of the invention, illustrating the three modes of its operation.

Referring now to FIGURE 2 in detail, an individual memory device M is shown which includes inactive metal electrodes $C_1$ and $C_2$ separated by a narrow gap. The third electrode A serves as the anode during the "write" step of the operation and is composed of a metal which is readily electroplatable, preferably copper. Other suitable metals include chromium and nickel.

A three-position, three-circuit switch S1 is used for selection of the three modes of operation of the apparatus, i.e., "write," "read," and "erase." A two-position, single circuit switch S2 allows the storage of a logical "1" or a logical "0." Although switches S1 and S2 are shown to be mechanical, high speed electronic "gates" are preferably employed, as will readily occur to one skilled in the computer art. Similarly, batteries $E_1$ and $E_2$ are shown for convenience in describing the circuit; however, any sources of electrical potential, such as conventional electronic power supplies, are also suitable. It will also occur to those skilled in the art that a single source of electrical potential can readily satisfy the requirements of all three modes of operation. Separate sources are shown merely to simplify the description of the circuit. $E_2$ is not restricted to direct current, but could be a source of alternating current.

As an example of the "write" mode, suppose that it is desired to store a logical "1" in the device. Suppose also that it is not known initially whether a "1" or a "0" is stored. The present state of the device is determined by placing S1 in the "read" position. If the gap between electrodes $C_1$ and $C_2$ is already bridged, as indicated by reading the potential across load resistance $R_L$, then it is apparent that a logical "1" is presently stored in the device. However, if a "0" is stored, as indicated by an open gap between $C_1$ and $C_2$, then switch S1 is placed in the "write" position and switch S2 is placed in the "1" position. This connects the positive terminal of source $E_1$ through the contact of switch S2 and the contacts S1A to anode A of device M. At the same time, the negative terminal of source $E_1$ is connected through current-limiting resistance $R_1$ and to the contacts of S1B and S1C to electrodes $C_1$ and $C_2$ of device M. The metal of anode A, preferably copper, is then plated on $C_1$ and $C_2$ until the gap therebetween is bridged. Switch S1 is returned to the "read" position, whereby one terminal of source $E_2$ is connected through resistance $R_L$ and through switch S1C to electrode $C_2$. The other terminal of source $E_2$ is connected through switch S1B to electrode $C_1$. The logical "1" completes the circuit through the device M whereby a voltage aproximately equal to that of source $E_2$ will appear across the terminals of resistance $R_L$. On the other hand, if a logical "0" is stored in device M, a substantially greater resistance would exist across the terminals of electrodes $C_1$ and $C_2$, although some electrical current would be conducted by the electrolytic bath. The voltage drop across $R_L$ then would be somewhat less than voltage $E_2$. By properly selecting the magnitude of load resistance $R_L$ with respect to the resistance of the electrolytic bath, ample difference in voltage across $R_L$ will exist to permit a suitable ease of differentiation between the "1" or "0" state of the device.

It may be desirable to clear the memory cell M before applying the "write" signal. This is accomplished by placing switch S1 in the "erase" position. In this position the anode A is connected through the current limiting resistance $R_1$ to the negative terminal or source $E_1$, and the cathodes $C_1$ and $C_2$ are connected to the positive terminal of source $E_1$. This is a reversal of polarity, compared with the "write" mode of operation, whereby any copper which may be present in the gap between electrodes $C_1$ and $C_2$ is returned to anode A by electroplating. The use of relatively inactive metal for cathodes $C_1$ and $C_2$ prevents any inadvertent excess transfer of metal from the cathodes to anode A during the "erase" mode of operation.

The polarity of source $E_2$ is immaterial. It may be opposite from that shown in the drawing, depending on the desired polarity of the output voltage.

Figure 3:
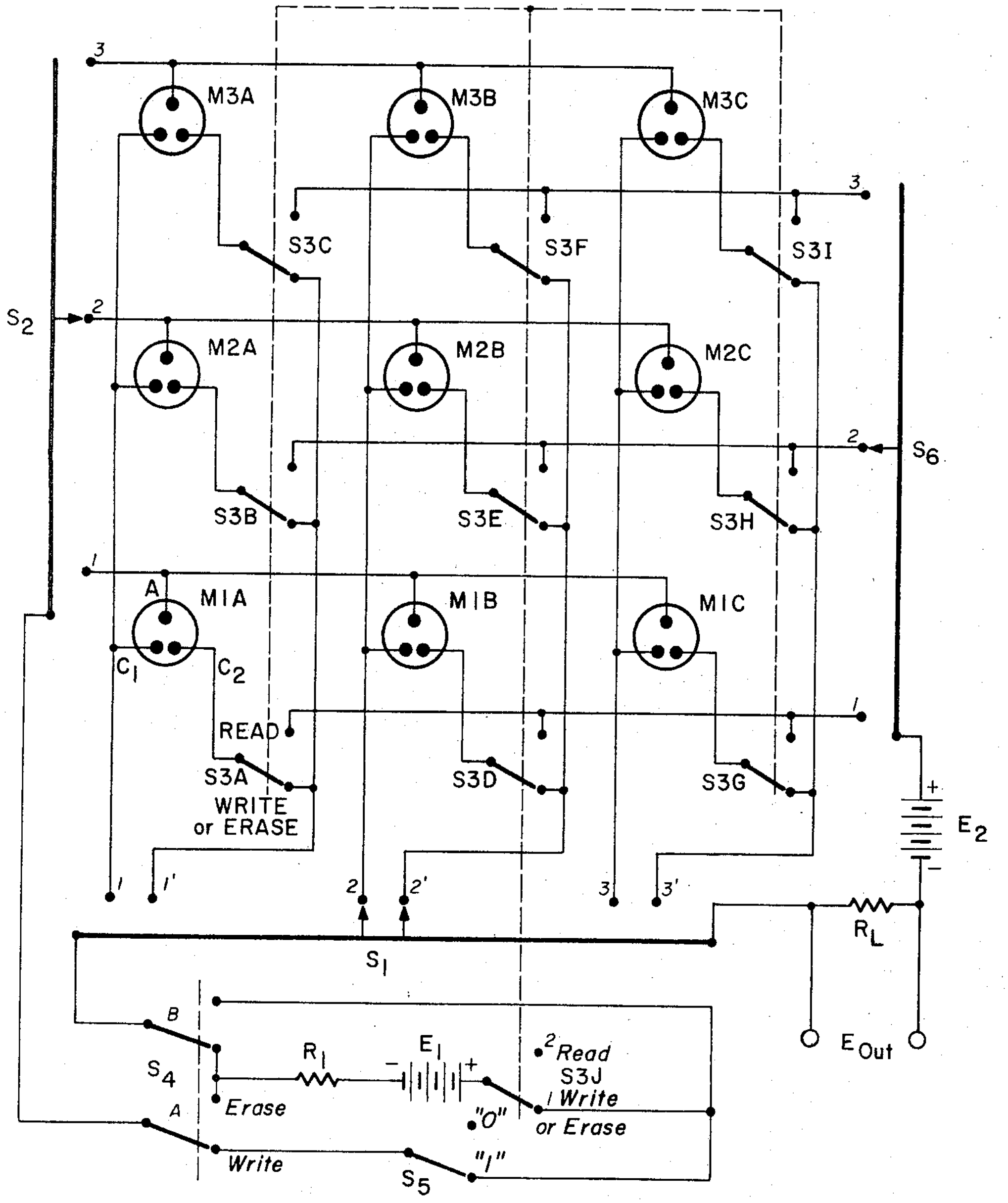
FIGURE 3 is a schematic example of electrical circuitry suitable for use in connection with the operation of a memory array using the device of the invention.

Referring now to FIGURE 3, an array of memory cells M1A through M3C is shown, any one of which can be individually selected for the "read," "write" or "erase" mode of operation. The basic modes are the same as described in FIGURE 2. Accordingly, the description of FIGURE 3 will be limited to an explanation of the means for selectively operating an individual cell. Switch S2 is used to select the row of memory cells wherein lies the particular memory cell in which a data bit is to be stored. Switch S1 is used to select the column of memory cells wherein lies the particular cell in which the data bit is to be stored, or to be read. Switch S6 is used to select the row of cells wherein lies the particular cell to be read. Switches S3A through S3J, shown mechanically ganged together for simultaneous operation, permit writing or erasing in one position and reading in the other position. Switch S4 selects either the "write" or "erase" mode by simply reversing the polarity of the voltage applied to switches S1 and S2.

For example, if it is desired to "write" or store a logical "1" into cell M2B, the switches are placed in the positions shown in FIGURE 3. The negative terminal of source $E_1$ is connected through the current-limiting resistor $R_1$ to the cathodes of M1B, M2B and M3B through switches S4B, S1, S3D, S3E, and S3F. The positive terminal of source $E_1$ is connected to the anodes of cells M2A, M2B and M2C through switches S3J, S5, S4A and S2. Accordingly, the only memory cell that receives both a positive and a negative voltage is cell M2B. Therefore it is the only cell in which the logical "1" is stored.

Similarly, to read a particular memory cell, such as M2B, switches S3A through S3J are placed in the "read" position. Voltage $E_1$ is disconnected from the circuit by switch S3J. One terminal of voltage $E_2$ is connected to one cathode of cells M1B, M2B and M3B through resistance $R_L$ and switch S1. The other terminal of $E_2$ is connected through switches S6, S3B, S3E and S3H to the other cathode of cells M2A, M2B and M2C. Thus it is seen that the only cell capable of completing the circuit lies in row 2, column B, i.e., cell M2B. By changing switches S1 and S6 in this manner, any one of the memory cells can be selected for reading.

Although only nine memory cells are shown in the drawing, an array can be readily designed to include any desired number of memory cells. It is again emphasized that in any event the switches are only schematically illustrated in the drawing, and are preferably high-speed electronic switches or gates."

To store a digital "word" consisting of a plurality of binary bits, one such memory cell would be used for each bit in the word. In a preferred embodiment, the individual arrays are placed one above the other to form a memory "stack."

The stored data does not depend on a continuous supply of power to the computer. That is, momentary or extended power supply interruptions do not cause a loss of the information stored in the memory. Considerable time is required to "load" a conventional computer memory after any interruption in the power supply. The present invention is particularly advantageous for storing computer programs and often-used sub-routines.

Referring again to FIGURE 1, the width of gap 15 will normally lie in the range of 0.0001 inch to 0.01 inch. Within this range, however, the optimum gap width will depend upon the choice of electrode metals, the lateral dimensions of the narrowly spaced conducting surfaces, the electrolyte concentration, and the plating current.

The choice of narrowly spaced electrodes 11 is not limited to platinum, silver and gold. It is essential merely that the metal of the "inactive" electrodes lie below the metal of electrode 18 in the Electromotive Force Series of the elements, whereby the "erase" step of the procedure may be conducted at a voltage which is capable of clearing the space between the inactive electrodes without at the same time causing inadvertent removal of some metal from the inactive electrodes. Cadmium, for example, has a lower electrode potential than either chromium or zinc, and is therefore suitable for the inactive electrodes, in combination with either of the latter metals as electrode 18.

What is claimed is:

1. An electronic device comprising an electrolytic bath having three metallic electrodes immersed therein, two of said elecrtodes being separated by a fixed narrow gap of between .0001 and .01 inch and being composed of a metal which lies below the metal of the third of said electrodes in the electromotive force series of the elements, means for passing a direct current between the third of said electrodes and the remaining two electrodes, means for reversing the polarity of said current, and means for detecting the presence of an electroplate bridge within said gap.

2. A device as defined by claim 1 wherein the electrodes forming said gap are electrically insulated from said bath, except for the surfaces adjacent said gap.

3. An electrochemical memory apparatus comprising an electrolytic cell, a "write" circuit, a "read" circuit and an "erase" circuit; said cell comprising an electrolytic bath, a pair of narrowly spaced inactive electrodes immersed therein, a third electrode immersed in said bath and composed of an electroplatable metal; said "write" circuit comprising a voltage source, the negative pole thereof being electrically connected to said narrowly spaced electrodes, and the positive pole thereof being electrically connected to said third electrode; said "read" circuit comprising means for detecting the presence of an electroplated metal bridge electrically connecting said narrowly spaced electrodes; said "erase" circuit comprising means for electrochemically returning the metal of said bridge to said third electrode; and switching means for selecting the desired one of said circuits.

References Cited

UNITED STATES PATENTS

| | | | |
|---|---|---|---|
| 2,939,113 | 5/1960 | Roth | 340—173 |
| 3,017,612 | 1/1962 | Singer | 340—173 |
| 3,172,083 | 3/1965 | Constantine | 340—173 |
| 3,211,968 | 10/1965 | Grams | 317—231 |

TERRELL W. FEARS, *Primary Examiner.*

IRVING SRAGOW, *Examiner.*